H. R. FARNSWORTH.
OILING DEVICE FOR PIPE THREADING AND SIMILAR MACHINES.
APPLICATION FILED JAN. 3, 1916.
1,207,887. Patented Dec. 12, 1916.
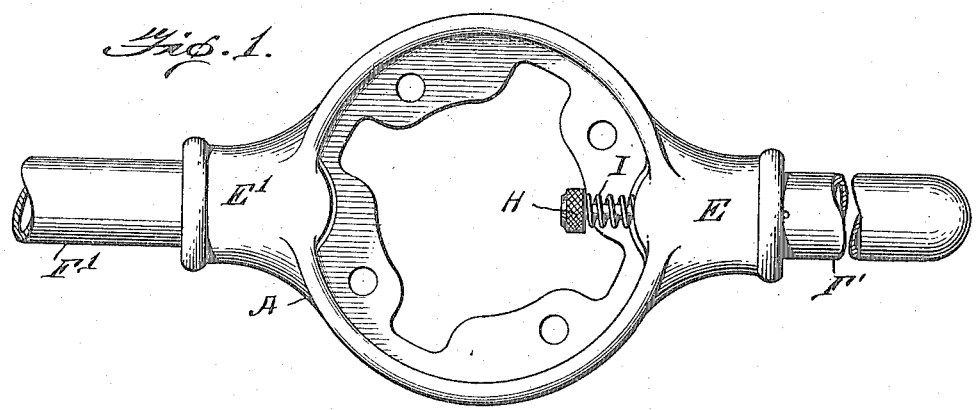
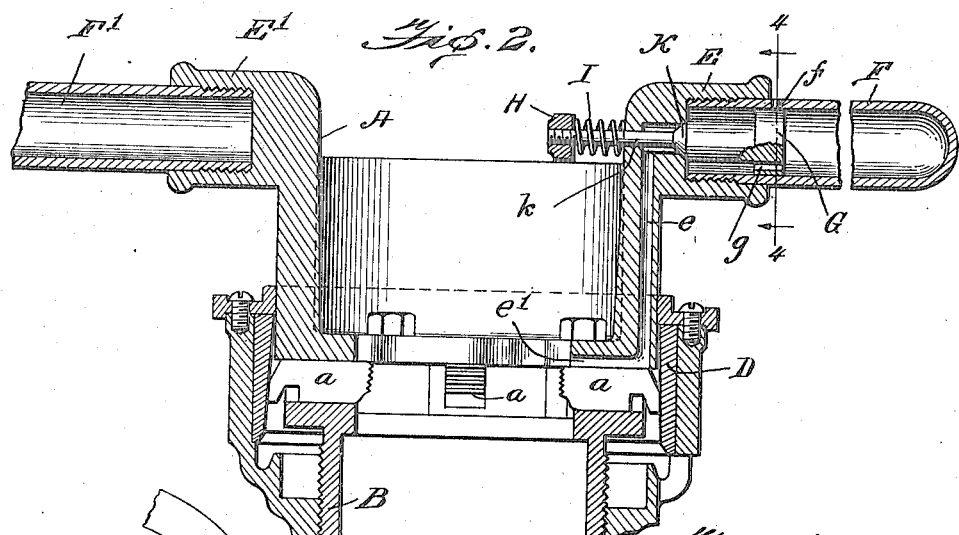
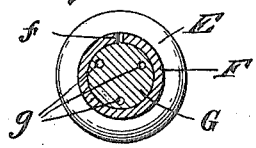
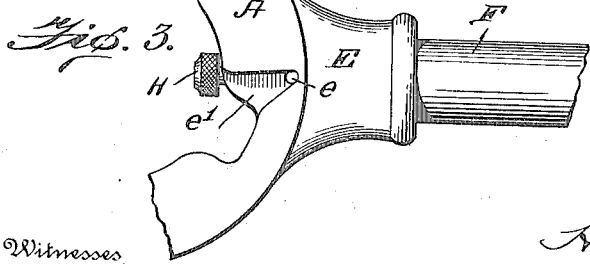

UNITED STATES PATENT OFFICE.

HILAND R. FARNSWORTH, OF SANDUSKY, OHIO, ASSIGNOR, BY MESNE ASSIGNMENTS, TO THE THREADING MACHINE COMPANY, OF SANDUSKY, OHIO, A CORPORATION OF OHIO.

OILING DEVICE FOR PIPE-THREADING AND SIMILAR MACHINES.

1,207,887.   Specification of Letters Patent.   Patented Dec. 12, 1916.

Application filed January 3, 1916. Serial No. 69,858.

*To all whom it may concern:*

Be it known that I, HILAND R. FARNSWORTH, a citizen of the United States, residing at Sandusky, in the county of Erie and State of Ohio, have invented certain new and useful Improvements in Oiling Devices for Pipe-Threading and Similar Machines; and I do hereby declare the following to be a full, clear, and exact description of the invention, such as will enable others skilled in the art to which it appertains to make and use the same.

This invention relates to lubricating devices for use in connection with hand or machine cutting tools, more particularly such as are used in machine shops and pipe fitting shops; for example, pipe-threading machines; the invention being capable of general application for oiling pipe-threading and pipe-cutting and other similar machines where oil is required on the article being cut.

The object of the invention is to produce an oiling device of the character referred to adapted to be operated by hand or automatically for supplying oil as needed in the operation of the machine, and which device shall be simple in construction, inexpensive in manufacture, and efficient and reliable in practical use.

The invention will first be hereinafter more particularly described, with reference to the accompanying drawings, which are to be taken as a part of this specification, and then pointed out in the claims at the end of the description.

In said drawings, Figure 1 represents a plan view of the revolving die stock or guide head of a pipe-threading machine with an oiling device embodying my invention thereon; Fig. 2 is a vertical sectional elevation of the same and of a portion of a pipe-threading machine to which it is attached, for the purpose of illustrating its application to a machine of that type; Fig. 3 is an inverted plan view of a broken-away portion of the device shown in Fig. 1; and Fig. 4 is a detail transverse section taken on the line 4—4 of Fig. 2.

My improved oiling device is shown in the accompanying drawings applied to a pipe-threading machine similar to that shown in the drawings of patent to A. L. Robbins, No. 887,741, dated May 12, 1908, for cutting a tapered thread; but it will be understood, of course, that the type of machine shown is selected merely for the purpose of illustration, as the invention is applicable to various types of machines and is not dependent upon any specific construction or arrangement of the die head or work holder, nor upon any particular means for advancing the die head as the work progresses, though a screw connection is shown as a convenient and preferred means to this end in this class of machines.

In said drawings, in which the same reference letters are used to denote corresponding parts in different views, the letter A denotes the revolving die stock or guide head of a pipe-threading machine to which is secured the die holder B which is exteriorly threaded and screwed into the case or work holder C, and between said head and die holder are arranged a series of radially movable screw cutting dies or chasers $a$, which project inwardly and are adapted to be brought into engagement with a pipe or other object for cutting a screw thread thereon as the die stock in turning is advanced by engagement of its feed-screw with the lead-screw of the work holder or casing C, in or upon which the die stock is revolubly mounted. As shown, an interiorly tapered or conical sleeve D surrounds the die stock and affords an abutment for the backs or outer ends of the dies, being revoluble therewith, so that as the work progresses by advance of the revolving head a gradual adjustment or recession of the dies is effected as required to cut a tapered thread.

While the die stock A is the revolving element in the form shown, such expression is used merely in a relative sense to indicate that the die head is revoluble relative to the work holder, as it is obvious that the invention is equally applicable to a construction in which the die stock or head is held stationary while the work holder revolves, the latter arrangement being considered the equivalent of the former. It will also be understood that in the illustrated application the work holder or casing is provided with means (not shown) whereby a pipe, rod, or other object to be threaded may be clamped or centered in the usual manner, as by means of set screws tapped through a contracted neck of the casing in the manner indicated in the above mentioned patent. But the pipe-threading mechanism forms no part of my present invention and need not be further described.

The die stock or head A may be formed or provided with a radially projecting socket or sockets E and E¹ which may be interiorly threaded for connection with an exteriorly threaded handle or handles F and F¹, which are preferably tubular and have their outer ends closed, at least one of them, as F, to adapt it to serve as an operating handle and also as an oil container for supplying lubricant to the work or cutting tools carried by the die stock. The tubular handle which is to serve also as an oil container has its outer end closed, preferably as an integral structure, though a detachable cap might be employed, the cap being adapted to be removed for filling. In the illustrated construction the tube itself is removable to adapt it to be readily filled with oil and again attached to the socketed head. Within the handle F is fitted a piston or plunger G, having a hole or holes $g$ therein through which oil may flow into the valve chamber behind the piston and which may be attached to or formed integrally with the stem of the valve K, which controls the outlet from the valve chamber behind the piston into a duct $e$ which leads through the guide head to a discharge port $e^1$, arranged over the dies or work and preferably V-shaped or flaring in form so that the oil will be evenly distributed over or upon the surface of the article that is being cut. The valve K is preferably formed at one end of an enlarged portion of the valve stem and the piston G at the other end thereof while a reduced extension $k$ protrudes through an aperture in the wall of the guide head and has a push button H thereon between which and the guide head is placed a coiled or other suitable spring I which yieldingly holds the valve closed. The piston G normally closes an air vent $f$ in the tube or oil container F through which air is admitted when the thumb valve or plunger is operated to open the valve and permit the outflow of oil or other lubricant, but when the pressure upon the thumb valve is released it and the piston will be returned to normal position by the pressure of the spring I, closing both the air inlet and the valve K, so as to prevent any further outflow of lubricant until the valve is again opened. This simple device permits the proper admission of air to the valve chamber so that the oil will not flow or be delivered through the valve so long as the air vent is closed, but on opening the valve the air vent will also be opened, thereby permitting the oil or lubricant to flow through the ducts $e$ and $e^1$ onto the article that is being cut. The valve K is adapted to be readily opened by pressure of the thumb or finger on the push button H, or by means of an automatic trip or operating device adapted to open the valve at intervals to permit the oil or lubricant to flow from the container onto the cutting tool or article which is being cut, as required in the operation of pipe threading and other machines to which the invention may be applied. The automatic trip may consist of any suitable device stationed where it will make contact at intervals with the push button H and open the valve; and preferably adapted to be thrown into and out of operative relation to the push button as desired for feeding a lubricant at greater or less intervals or in greater or less quantity as may be desired in the operation of the particular machine to which the oiling device may be applied.

I am aware that it has been proposed to provide a die stock with a tubular handle serving also as an oil container, together with valve mechanism inclosed within the tubular handle, and I do not claim any such arrangement. My improved oiling device comprises a valve mechanism carried by the die stock or guide head, the valve being seated within a socket to which the operating handle is attached, and when assembled the valve mechanism becomes practically a permanent part of the head, without any connection with the handle, though arranged to operate in conjunction therewith, the handle serving as an oil container or reservoir and arranged to receive a piston on the valve stem which normally closes an air vent in the handle adapted to admit air when the valve is open so that the oil may flow out of the valve chamber onto the cutting tool or article that is being cut, the piston being movable in unison with the valve, whereby the valve mechanism is protected against injury which is liable to be encountered in practical use, while the handle is adapted to be removed for cleaning and filling with oil without interfering with the valve mechanism.

Having thus described my invention, what I claim as new and desire to secure by Letters Patent is:

1. An oiling device of the character referred to comprising a guide head having a socket and a duct leading therefrom to the cutting dies, a tubular handle detachably secured in said socket adapted to serve as an oil container, said handle having an air vent therein, a valve seated in said socket in communication with the interior of said handle and having its stem protruding through said head, a piston in said handle movable with said valve and normally closing said vent; said piston having an oil passage therethrough, and means on said stem for yieldingly holding said valve to its seat.

2. An oiling device of the character referred to comprising a guide head having a socket and a duct leading from said socket to the cutting tools, a tubular handle detachably secured in said socket and adapted to serve as an oil container, a valve seated in said socket having its stem protruding through said head and said stem having means thereon for yieldingly holding the valve to its seat, and a piston in said handle movable with said valve and having an oil passage therethrough; said handle having an air inlet therein normally closed by said piston.

3. In a machine of the character described, an oiling device comprising a work holder and a die-carrying head revoluble relatively thereto, said head having an operating tubular handle adapted to contain oil or other lubricant, and a conduit therethrough leading from said container to the cutting tool or article which is being cut, said handle having an air inlet therein, and a valve controlling said conduit, together with means movable with said valve for simultaneously opening said air inlet and valve.

4. In a machine of the character described, a revoluble die-carrying head having a tubular operating handle adapted to serve as an oil container, a conduit leading through said head from the interior of the handle to the point where oil is required on the article to be cut, a valve carried by said head controlling said conduit adapted to be opened by pressure of the thumb or finger, means for normally holding said valve closed, an air vent through said tube for admitting air into the valve-chamber and means for opening and closing said vent simultaneously with the opening and closing of the valve.

5. An oiling device for a pipe-threading machine or the like comprising a work holder, a revoluble head mounted on said work holder and having a socket, a tubular handle having one end secured in said socket, a valve seated in said socket having its stem protruding through an aperture in said head, means on said stem for keeping said valve normally closed, an air vent in said tube, a piston removable with said valve for opening said air vent when said valve is opened, said piston having an oil duct therein permitting the passage of oil therethrough to the valve-chamber, and said head having a passage therein leading from said valve-chamber to the cutting tool or article to be cut.

6. In combination with a pipe-threading machine or the like, a relatively stationary work holder, a die stock or head mounted on said work holder and revoluble relatively thereto; said head having a handle socket and a channel leading therefrom to the cutting tool or article to be cut, a tubular oil container and handle having one end secured in said socket and its other end closed, a valve seated in said socket having its stem protruding through an aperture in the head, means on said stem for holding said valve normally closed, a piston movable with said valve having an oil passage therethrough, and an air vent in said handle or container normally closed by said piston adapted to admit air to the valve-chamber when the valve is open.

7. In combination with a pipe-threading machine or the like, a relatively stationary work holder, a die stock or head mounted on said work holder and revoluble relatively thereto; said head having an interiorly threaded handle socket and a channel leading therefrom to the cutting tool or article to be cut, a tubular oil container and handle having one end screwed into said socket and the other end closed, a valve seated in said socket having its stem protruding through an aperture in the head, a push-button on said stem adapted to be actuated at intervals for opening the valve automatically or by thumb or finger pressure, a spring for holding said valve normally closed, a piston in said container movable with said valve and having an oil passage therethrough, and an air vent in said container normally closed by said piston; said valve being adapted to be opened by pressure on said stem to simultaneously open said vent, thereby permitting the oil to flow, and vice versa.

8. In combination, a work head having an interiorly threaded socket and an oil duct leading therefrom to the cutting dies, a valve seated in said socket having its stem protruding through said head, a spring on said stem normally holding the valve to its seat, a tubular handle screwed into said socket having its free end closed, said handle having an air vent therein, and a piston normally closing said vent and movable with said valve to adapt it to open the vent when the valve is opened.

In testimony whereof I affix my signature in the presence of two witnesses.

HILAND R. FARNSWORTH.

Witnesses:
WILLIAM D. GRIFFITH,
PAUL H. MISEKE.

Copies of this patent may be obtained for five cents each, by addressing the "Commissioner of Patents, Washington, D. C."